(12) United States Patent
Ishikawa et al.

(10) Patent No.: US 7,203,399 B2
(45) Date of Patent: Apr. 10, 2007

(54) OPTICAL FIBER AND FIBER GRATING TYPE FILTER INCLUDING THE SAME

(75) Inventors: Shinji Ishikawa, Yokohama (JP);
Toshiki Taru, Yokohama (JP);
Masakazu Shigehara, Yokohama (JP);
Masaki Ohmura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 212 days.

(21) Appl. No.: 10/747,085

(22) Filed: Dec. 30, 2003

(65) Prior Publication Data

US 2004/0151467 A1    Aug. 5, 2004

Related U.S. Application Data

(63) Continuation-in-part of application No. PCT/JP03/05552, filed on Apr. 30, 2003.

(30) Foreign Application Priority Data

Apr. 30, 2002    (JP)    ............................. P2002-128699

(51) Int. Cl.
*G02B 6/00*    (2006.01)

(52) U.S. Cl. ......................... 385/37; 385/144; 385/123

(58) Field of Classification Search .................. 385/37, 385/144, 123–127
See application file for complete search history.

(56) References Cited

U.S. PATENT DOCUMENTS 6,005,999 A    12/1999 Singh et al.

(Continued)

FOREIGN PATENT DOCUMENTS

AU    2804701 A    9/2001

(Continued)

OTHER PUBLICATIONS

Pureur, D., et al. "Improvements in the Realization of Fiber Slanted Gratings." Colloquium On Optical Fibre Gratings, Mar. 26, 1999, XP006500408, pp. 3/1-3/4.

(Continued)

*Primary Examiner*—Kevin S. Wood
(74) *Attorney, Agent, or Firm*—McDermott Will & Emery LLP (57) ABSTRACT

The present invention relates to an optical fiber having a structure which allows further improvements to be made both in terms of lower reflectance and narrower bandwidth, and to a fiber grating type filter including the optical fiber. The optical fiber applied to the fiber grating type filter comprises a core region extending along a predetermined axis, and a cladding region provided on an outer periphery of the core region. The core region does not contain any photosensitive dopant which contributes to predetermined wavelength light photosensitivity as a glass property, but a part of the cladding region contain such a photosensitive dopant. By means of this composition, it is possible to form a grating, which has a grating plane slanted by a predetermined angle with respect to the optical axis, in a part of the cladding region surrounding the core region.

4 Claims, 9 Drawing Sheets

U.S. PATENT DOCUMENTS

| | | | |
|---|---|---|---|
| 6,104,852 A | 8/2000 | Kashyap | |
| 6,292,606 B1 | 9/2001 | Riant et al. | |
| 6,314,221 B1 * | 11/2001 | Riant et al. | 385/37 |
| 6,321,007 B1 | 11/2001 | Sanders | |
| 6,321,008 B1 * | 11/2001 | Riant et al. | 385/37 |
| 6,516,118 B1 * | 2/2003 | Brilland et al. | 385/37 |
| 2002/0003926 A1 | 1/2002 | Enomoto et al. | |

FOREIGN PATENT DOCUMENTS

| | | |
|---|---|---|
| CN | 1279770 T | 1/2001 |
| CN | 1314597 A | 9/2001 |
| EP | 1022595 A1 | 7/2000 |
| EP | 1 137 127 A2 | 9/2001 |
| EP | 1137127 A2 | 9/2001 |
| EP | 1 154 294 A1 | 11/2001 |
| EP | 1191365 A1 | 3/2002 |
| JP | 2000-0503414 | 8/2000 |
| JP | 2000-266945 | 9/2000 |
| JP | 2000-266945 A | 9/2000 |
| JP | 2001-524689 | 8/2001 |
| JP | 2001-267665 | 9/2001 |
| JP | 2001-267665 A | 9/2001 |
| JP | 000-503414 A | 8/2006 |
| JP | 2001-524689 A | 8/2006 |
| WO | WO 97/26571 | 7/1997 |
| WO | WO 97/26571 A2 | 7/1997 |
| WO | WO 99/27401 | 6/1999 |
| WO | WO 99/27401 A1 | 6/1999 |
| WO | WO 00/42459 | 7/2000 |
| WO | WO 00/42459 A1 | 7/2000 |

OTHER PUBLICATIONS

Poulsen, T. et al. Bragg grating induced cladding mode coupling caused by ultra-violet light absorption. Electronics Letters, IEE Stevenage, GB, vol. 34, No. 10, May 14, 1998, XP006009758, pp. 1007-1009.

English Translation of Japanese Office Action dated May 19, 2006.

* cited by examiner

OPTICAL FIBER AND FIBER GRATING TYPE FILTER INCLUDING THE SAME

RELATED APPLICATIONS

This is a Continuation-In-Part application of International Patent application serial No. PCT/JP03/05552 filed on Apr. 30, 2003, now pending.

BACKGROUND OF THE INVENTION

1. Field of the Invention

The present invention relates to a fiber grating type filter including an optical fiber in which a slanted grating is formed across a predetermined region along a longitudinal direction thereof, and to an optical fiber that can be applied to the fiber grating type filter.

2. Related Background Art

An optical component, obtained by forming a grating in the core region, in a predetermined region along a longitudinal direction of the optical fiber, is generally called as a fiber grating type fiber. There are two types of grating provided in thus filters; a Long-Period Grating (LPG) with a grating period of several hundred μm, and a Short-Period Grating (SPG) with a grating period of several hundred nm. Furthermore, a short-period grating can be classed as a Fiber Bragg Grating (FBG) whose grating plane is formed perpendicularly to the optical axis, and a Slanted Fiber Grating (SFG) whose grating plane is inclined by a predetermined angle with respect to the optical axis.

In the case that a loss filter based on an optical fiber of the kind described above is applied to a gain equalization for an optical amplifier, are turned reflection light with a large power will cause deterioration of the properties of the optical amplifier. Of the three types of grating described above, two types of grating, that is, the LPG and SFG type gratings are capable of reducing the power of the returned reflection light, and can be applied to loss filters for gain equalization. On the other hand, when equalizing gain of the optical amplifier, loss wavelength characteristics which can cancel wavelength dependence in the amplification gain are required. The SFG type filter has an advantage in that it allows desired loss characteristics to be created in a shorter length than the LPG type filter, and hence it is suitable in the loss filters for gain equalization.

Furthermore, in order to obtain desired loss characteristics as a gain equalizing filter in an optical amplifier, the SFG type filter is also required to have a narrow loss bandwidth. In the SFG, the angle of slant of the grating plane with respect to the optical axis is set to a predetermined value, in order to reduce the power of the returned reflection light. This angle of slant depends on the actual structure of the optical fiber in which the grating is to be formed. Generally, the increase of the angle of slant results the reduction of reflected light. On the other hand, in the SFG, the angle of slant must also be reduced in order to restrict the loss bandwidth. Consequently, there is a trade-off between reduction of the returned reflection light and compression of the bandwidth.

U.S. Pat. Nos. 6,292,606B1, 6,314,221B1 and 6,321,008B1 respectively disclose technology for resolving the aforementioned problem. An SFG type filter as disclosed in these patent publications is provided with an optical fiber comprising an inner core, an outer core, and a cladding region having a lower refractive index than the outer core, disposed so as to extending along a predetermined axis, and a slanted grating formed inside this optical fiber. In such an optical fiber, the inner core is composed of silica glass doped with $P_2O_5$ or $Al_2O_3$ as a refractive index increaser, and has no ultraviolet light photosensitivity. The outer core is composed of silica glass doped with $GeO_2$ as a refractive index increaser, and does have ultraviolet light photosensitivity. Moreover, the cladding region is also comprised of silica glass, but this cladding region is doped with $GeO_2$ in order that it is photosensitive to ultraviolet light. On the other hand, the cladding region is also doped with fluorine which serves to reduce the refractive index in such a manner that it is lower than that of either the inner core or the outer core.

In other words, in the optical fiber applied to the SFG type filter as disclosed in the foregoing patent publications, the core region with a high refractive index has a double-layer structure (dual core structure) comprising an inner core and outer core, and the cladding region has a structure of lower refractive index than the core region. Moreover, in the optical fiber having thus structure, while the outer part of the core region (outer core) and the cladding region are photosensitive to ultraviolet light, the inner part of the core region (inner core) is not photosensitive to ultraviolet light.

In this specification, "photosensitivity" means that the glass property change, for instance, the change of refractive index, when irradiated with light of a predetermined wavelength. For example, when silica glass that is photosensitive to ultraviolet light is irradiated with light of 270 nm or less (ultraviolet light), then the refractive index of the glass changes due to the reaction induced by ultraviolet radiation. Possible light sources for ultraviolet radiation include, for example, a KrF excimer laser (248 nm), a fourth-harmonic source (265 nm) of YAG laser, a second-harmonic source (244 nm) of Ar ion laser, or a second-harmonic source (255 nm) of $Cu^+$ laser, or the like. When the optical fiber having a structure such as that described above is exposed in a ultraviolet intensity modulation which should be formed by means of a phase grating, intensity modulation mask, or the like, then a grating having a refractive index which varies periodically along the longitudinal direction of the optical fiber will be formed in the photosensitive glass region.

Therefore, in the SFG type filter as described in the aforementioned patent publications, no grating is formed in the inner core which has no photosensitivity, but a grating is formed in the outer core and cladding region which do have photosensitivity. In the SFG type filter having thus composition, both of the characteristics demanded for filter operation, namely, reduced the power of the returned reflection light and narrower bandwidth, are satisfied. Furthermore, since the angle of slant can be made relatively small, a merit is obtained in that the polarization dependent loss (PDL) that arises in accordance with the angle of slant is low.

SUMMARY OF THE INVENTION

As a result of detailed investigation of conventional fiber grating type filters, the present inventors have discovered the following problems. Namely, although the SFG type filter disclosed in the aforementioned patents has improved characteristics in terms of both reflectance and bandwidth, as well as polarization dependent loss, these characteristics are not improved to a satisfactory degree. Moreover, since the core region has a double-layer structure, there is a problem in that the structure of the optical fiber becomes complex.

The present invention was devised with the foregoing in view, an object thereof being to provide an SFG type filter that is easy to fabricate and also achieves improvements in terms of reducing reflectance and restricting bandwidth, as well as a structure for an optical fiber which can be applied to the SFG type filter.

The fiber grating type filter according to the present invention achieves by adjusting the structure of the optical fiber. This fiber structure allows the narrowing loss bandwidth of individual filter and the reduction of reflectance. Then, the loss spectrum of the actual filter can be controlled with high precision. The filter can be applied widely as gain equalizers for optical amplifiers, or the like.

The optical fiber applied to the aforementioned fiber grating type filter (the optical fiber according to the present invention) is mainly composed of silica glass, and comprises: a core region, and a cladding region provided on an outer periphery of the core region. In particular, the core region does not contain a photosensitive dopant that contributes to predetermined wavelength light photosensitivity as a glass property. Whereas a part of the cladding region contains such a photosensitive dopant. Thus structure has a merit in that it is easy to fabricate, since the core region has a single-layer structure.

More specifically, it is preferable that the cladding region comprises: an inner cladding which is a glass region doped with the photosensitive dopant, and an outer cladding which is provided on an outer periphery of the inner cladding and which does not contain the photosensitive dopant. In this case, for example, the inner cladding corresponds to the part of the cladding that contributes to propagation of the light (optical cladding), and the outer cladding corresponds to a physical cladding (jacket layer) provided in order to impart physical strength to the optical fiber. The photosensitive dopant described above maybe $GeO_2$, $B_2O_3$, or the like, for example, but when $GeO_2$ is used in order to increase the refractive index, then the amount of $GeO_2$ dopant is preferably 2 to 10 wt %. In other words, it is preferably that the glass region doped with $GeO_2$ is doped with $GeO_2$ of 2 wt % or more, in order to produce satisfactory modulation of the refractive index. When the amount of $GeO_2$ dopant exceeds 10 wt %, then it becomes difficult to perform co-doping of other elements or compounds without $GeO_2$, (for example, fluorine, $B_2O_3$, or the like,) and hence it is established that the amount of $GeO_2$ dopant does not exceed 10 wt %.

Moreover, in the optical fiber according to the present invention, chlorine may be included in the core region in order to increase the refractive index. In this case, although the refractive index of the core region is increased above that of pure silica glass, since the core has no photosensitivity, a merit is obtained in that the fabrication of the fiber structure can be performed more easily. The amount of increase in the refractive index with respect to the amount of chlorine dopant is approximately 0.11% per 1 wt %, and hence the refractive index profile of the optical fiber can be easily adjusted by adding chlorine at a ratio of 0.05 wt % or more. On the other hand, the core region may also be comprised of pure silica glass. In this case also, since the core region has no photosensitivity, an optical fiber suitable for an SFG type filter can be obtained. Desirably, the relative refractive index difference between the core region and the glass region containing the photosensitive dopant (part of the cladding region) is 0.30% or more but 0.40% or less.

Moreover, it is preferable that, in order to achieve a sharp loss spectrum, the optical fiber according to the present invention has a cutoff wavelength shorter than the minimum wavelength of the used wavelength band, for example, shorter than 1.3 μm but longer than 1.1 μm.

The fiber grating type filter according to the present invention is an SFG type filter comprising an optical fiber having the above-mentioned structure, and a short-period grating having a grating plane that is slanted to the optical axis.

In thus SFG type filter, no grating is formed in the core region with a high refractive index, but a short-period grating having a grating plane that is slanted with respect to the optical axis is formed in at least apart of the cladding region (the region doped with the photosensitive dopant). By means of this composition, a merit is obtained in that the angle of slant at which low reflectance is achieved can be reduced. By reducing the angle of slant in this way, not only can the loss bandwidth be narrowed, but furthermore, the polarization dependent loss can also be reduced, at the same time. In concrete terms, the angle of slant is given by the angle formed between the normal to the optical axis and the grating plane of the grating, and desirably, this angle is greater than 1° and less than 2°.

Moreover, in order to reduce the transmission loss of the optical fiber applied to the fiber grating type filter according to the present invention, it is preferable that the core region is comprised of pure silica glass or chlorine-doped silica glass. Moreover, since the core region constituted by a uniform material, a merit is obtained in that the optical fiber can be easily fabricated.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

The following embodiments of an optical fiber and a fiber grating type filter according to the present invention are described in detail with reference to FIGS. 1A to 6E and FIGS. 7 to 11. In the descriptions of the drawings, elements that are the same are labeled with the same reference numerals, and duplicated description thereof is omitted.

(First Embodiment)

Figure 1A:
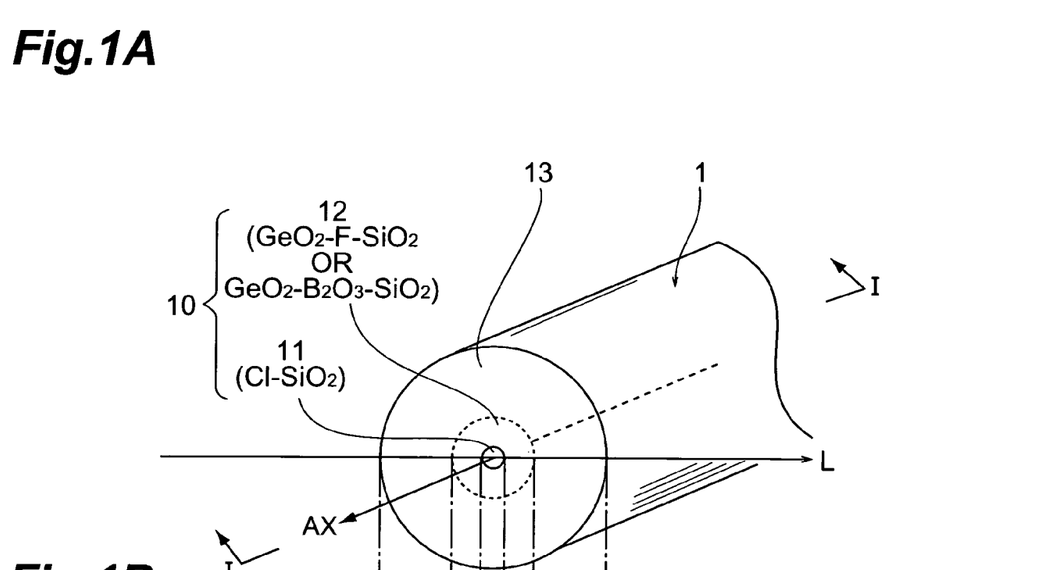
FIGS. 1A and 1B shows the cross-sectional structure of an optical fiber applied to a first embodiment of a fiber grating type filter according to the present invention, and the optical power distribution thereof.
Figure 1B:
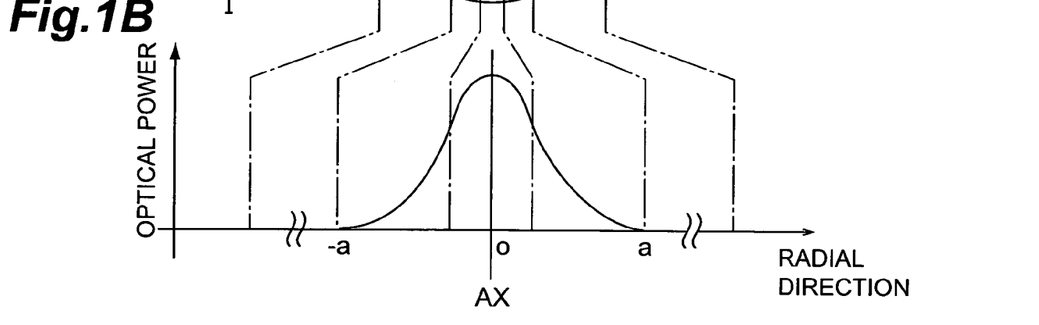
Figure 2A:
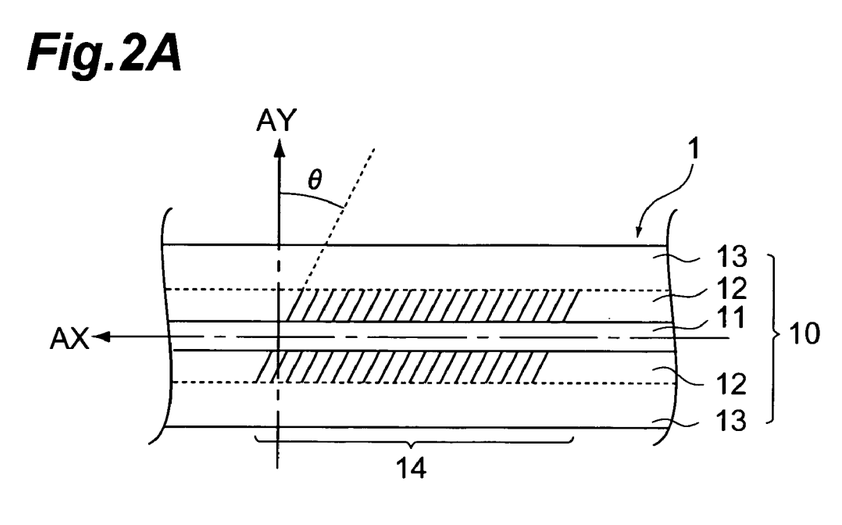
FIGS. 2A and 2B illustrate the cross-sectional structure of a fiber grating type filter according to the first embodiment, and the method of fabricating the same.

A first embodiment of a fiber grating type filter according to the present invention will be described. FIG. 1A shows the cross-sectional structure of an optical fiber applied to the fiber grating type filter according to the first embodiment, and FIG. 1B shows the optical power distribution therein. Moreover, FIGS. 2A and 2B serve to illustrate the cross-sectional structure (cross-sectional view taken along the line I—I in FIG. 1A) of the fiber grating type filter (SFG type filter) according to the first embodiment, and a method of fabricating the same. FIG. 3A shows the cross-sectional structure of the optical fiber in FIG. 1A, FIG. 3B shows the concentration profile of $GeO_2$, FIG. 3C shows the concentration profile of chlorine, FIG. 3D shows the concentration profile of fluorine, FIG. 3E shows a refractive index profile indicating the refractive index at respective positions along a line L in FIG. 1A, and FIG. 3F shows the photosensitivity distribution normalized by taking the maximum value as 1, each of the above diagrams being depicted in such a manner that they are respectively aligned in the radial direction.

As shown in FIG. 1A, the fiber grating type filter 1 according to the first embodiment comprises an optical fiber 10 mainly comprised of silica glass. This optical fiber 10 comprises a core region 11 extending along a predetermined axis AX, an inner cladding 12 provided on the outer periphery of the core region 11, and an outer cladding 13 provided on the outer periphery of the inner cladding. In this first embodiment, the core region 11 is doped with chlorine in order to increase the refractive index. The inner cladding 12 substantially corresponds to an optical cladding, and while being doped with $GeO_2$, a photosensitive dopant which also acts to increase the refractive index, it is also doped with fluorine, which acts to reduce the refractive index, in such a manner that the relative refractive index difference of the core region 11 is adjusted to 0.25% to 0.45%, and preferably, 0.30% to 0.40%. The outer cladding 13 substantially corresponds to a physical cladding (jacket layer). As illustrated in FIG. 1B, the optical cladding 12 is a glass region with an outer diameter 2a which provides the substantial contribution of the cladding region to the propagation of the light. Furthermore, the physical cladding, which is also known as the jacket layer, is located on the outermost edge of the cladding region, and is a glass region provided in order to impart mechanical strength to the optical fiber 10.

Figure 2B:
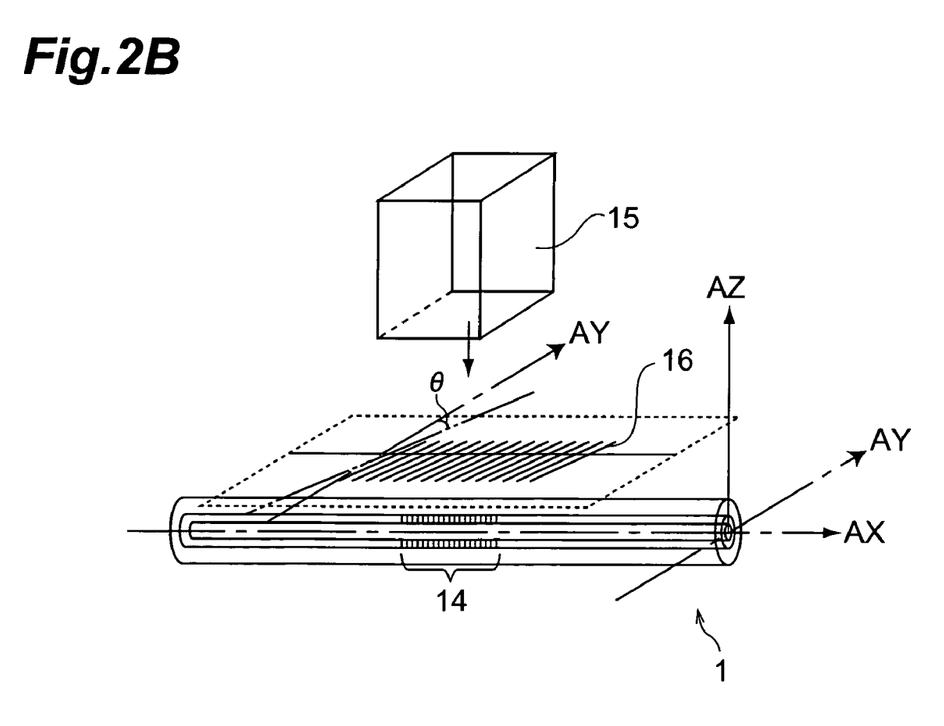
Figure 3A:
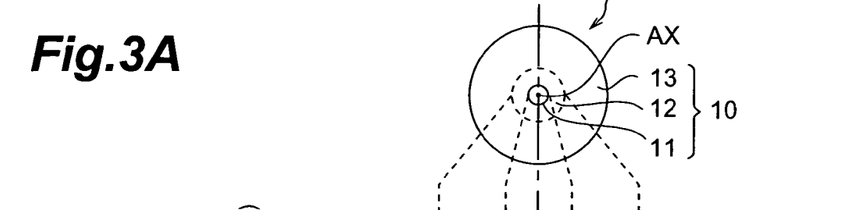
FIGS. 3A to 3F illustrate the composition of an optical fiber applied to the fiber grating type filter according to the first embodiment.

In the fabrication of the fiber grating type filter 1 (SFG type filter) according to the first embodiment, as illustrated in FIG. 2B, firstly, ultraviolet light with a wavelength of 270 nm or less is irradiated from an ultraviolet light source 15, towards a phase grating 16 which is inclined at a predetermined angle of θ with respect to the optical axis AX of the optical fiber 10. By using thus phase grating 16, an ultraviolet light intensity distribution is created wherein the intensity of the irradiated ultraviolet light is modulated. By exposing the optical fiber 10 in the space where this ultraviolet light intensity distribution is created, a slanted grating wherein the refractive index changes periodically along the longitudinal direction of the optical fiber 10, is formed in a predetermined region 14 (filter region) of the optical cladding 12 which is photosensitive (see FIG. 2A). In FIG. 2A, the diagonal lines shown in the predetermined region 14 of the optical fiber 10 indicate the grating plane of the grating, and this grating plane is inclined with respect to the direction in which the light propagates (which coincides with the optical axis AX of the optical fiber 10). In other words, an angle of slant θ of the grating plane (an angle formed between the normal of the grating plane and the optical axis) is not 0°. Also, the slanted grating is not formed in the core region 11 with a high refractive index, but is only formed in the optical cladding 12.

Figure 3B:
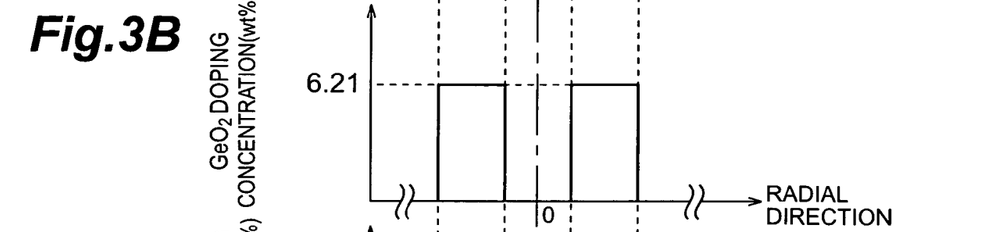
Figure 3C:
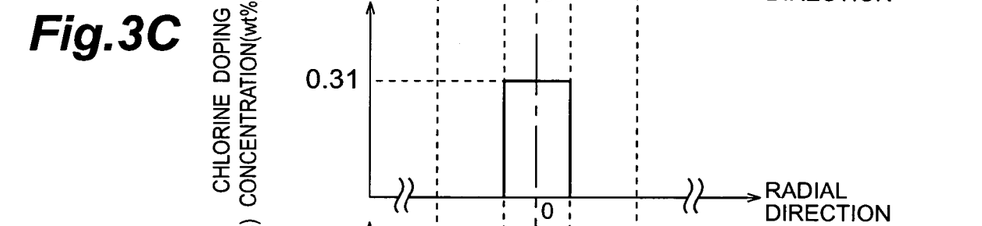
Figure 3D:
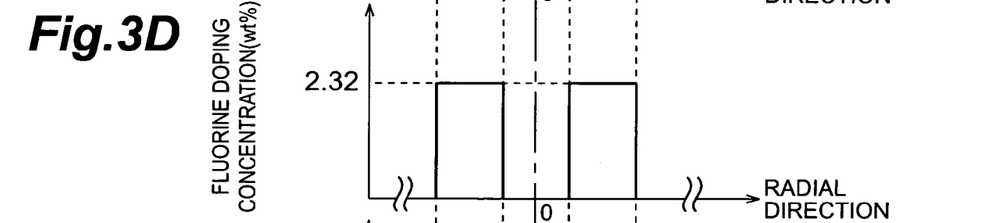
Figure 3E:
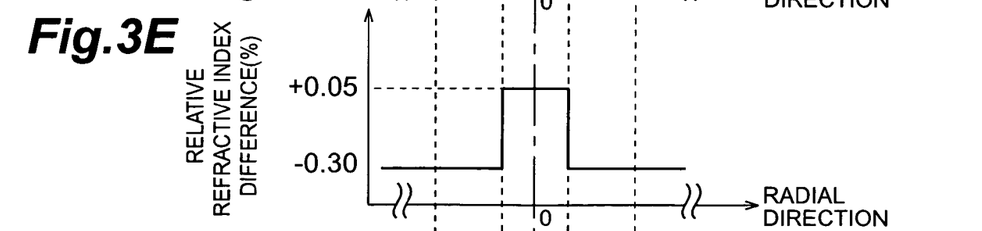
Figure 3F:
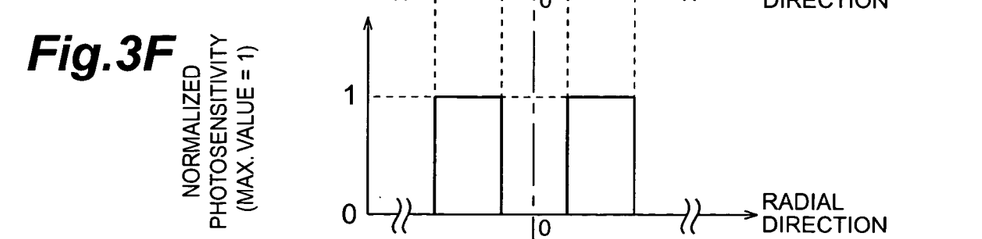

As shown in FIG. 3B, the core region 11 does not contain $GeO_2$, but the optical cladding 12 is doped with $GeO_2$. This $GeO_2$ acts to increase the refractive index. On the other hand, the $GeO_2$ also provides the doped glass region with ultraviolet light photosensitivity. By adopting thus composition, the optical fiber 10 is caused to be photosensitive only in the optical cladding 12, as illustrated in FIG. 3F.

Furthermore, as illustrated in FIG. 3C, the core region 11 is also doped with chlorine in the optical fiber 10. The chlorine mainly takes a chemical bonding structure of Si—Cl. Thereby, the added chlorine acts to increase the refractive index.

As shown in FIG. 3E, the optical cladding 12 is doped with fluorine. This fluorine mainly takes a chemical bonding structure of Si—F. Thereby, the added fluorine acts to reduce the refractive index. It is also possible to dope the optical cladding 12 with $B_2O_3$ instead of fluorine. $B_2O_3$ has a similar effect to fluorine in reducing the refractive index.

By setting the concentration profiles of the $GeO_2$, Cl, F (and/or $B_2O_3$) to those illustrated in FIG. 3B to FIG. 3D, a refractive index profile can be obtained in which the refractive index of the core region 11 is higher than that of the optical cladding 12 or physical cladding 13, as shown in FIG. 3E. The relative refractive index difference between the core region 11 and the optical cladding 12 in the optical fiber 10 is preferably 0.25% to 0.45%, which is equivalent to a 1.3 SMF (single-mode fiber) having a zero-dispersion wavelength in the 1.3 μm wavelength band. More preferably, the relative refractive index difference between the core region 11 and the optical cladding 12 is 0.30% to 0.40%. Furthermore, the cutoff wavelength for guaranteeing single-mode operation (wavelength $\lambda_c$) must be shorter than the shortest wavelength of the used wavelength band in the loss filter (for example, 1.3 μm). However, it is not preferable that the wavelength $\lambda_c$ is 1.1 μm or less, since this causes the bending loss increasing.

As described above, in the SFG type filter 1 according to a first embodiment, no grating is formed in the core region 11, and a grating is formed in the optical cladding 12 only, through a predetermined region 14 extending along the longitudinal direction of the optical fiber 10. This grating is a slanted grating whose grating plane is slanted by an angle of θ with respect to the optical axis AX.

This SFG type filter has a characteristic feature in that it allows the angle of slant θ at which low reflectance is achieved to be reduced. By reducing this angle of slant θ, not only is it possible to narrow the loss bandwidth, but it is also possible to reduce the polarization dependent loss. Additionally, since the chlorine added to the core region 11 does not absorb light in the 1.3–1.6 μm band, which is the used wavelength band in optical communications, then the individual fiber will have low loss. Moreover, since the core region 11 is made from a uniform material, its structure is simplified.

(Second Embodiment)

Figure 4A:
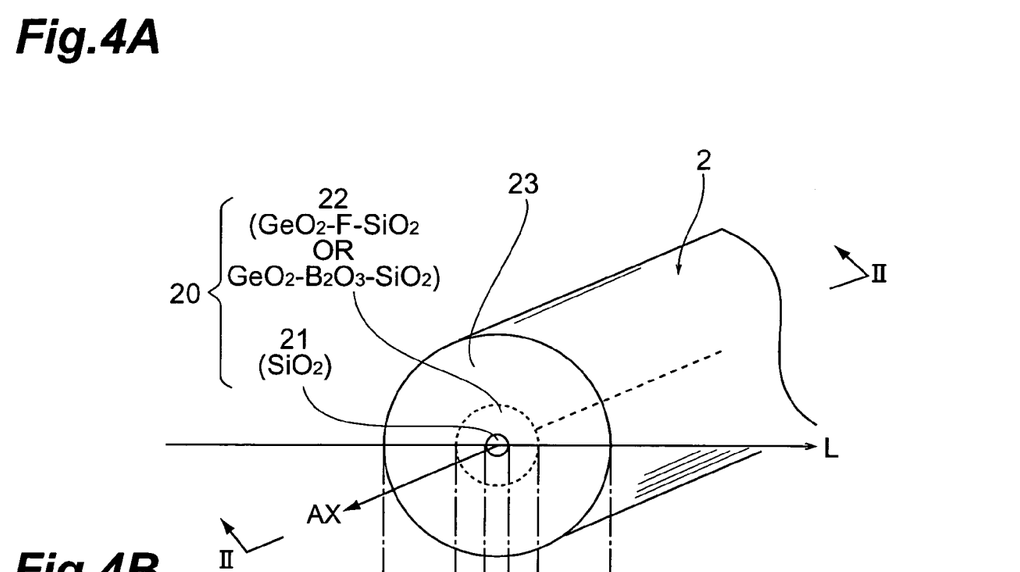
FIGS. 4A and 4B illustrate the cross-sectional structure of an optical fiber applied to a second embodiment of a fiber grating type filter according to the present invention, and the optical power distribution thereof.
Figure 4B:
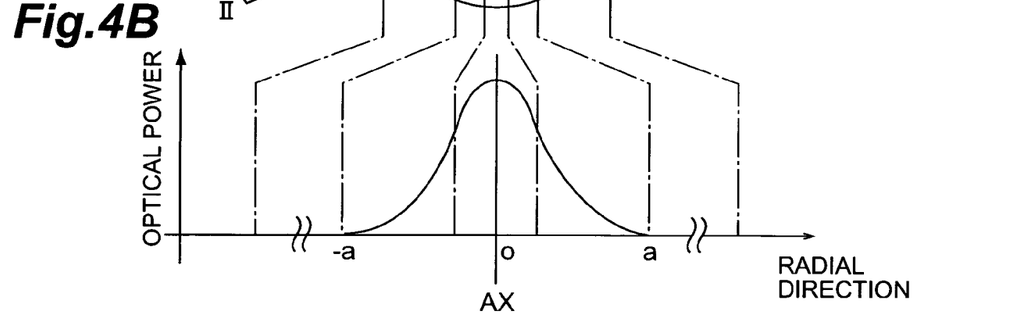
Figure 5A:
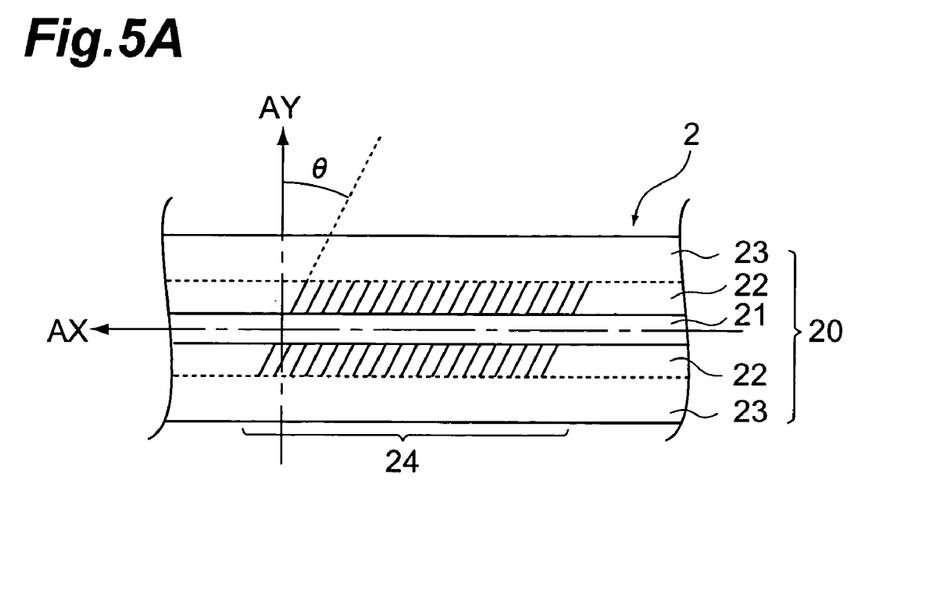
FIGS. 5A and 5B illustrate the cross-sectional structure of a fiber grating type filter according to a embodiment, and the method of fabricating the same.

Next, a second embodiment of a fiber grating type filter according to the present invention will be described. FIG. 4A shows the cross-sectional structure of an optical fiber used in a fiber grating type filter according to the second embodiment, and FIG. 4B shows the optical power distribution of the same. Furthermore, FIGS. 5A and 5B respectively show the cross-sectional structure of a fiber grating type filter (SFG type filter) according to the second embodiment (a cross-sectional view along line II—II in FIG. 4A), and a diagram for illustrating a method for fabricating the same. FIG. 6A is a cross-sectional structure of the optical fiber in FIG. 4A, FIG. 6B shows the concentration profile of $GeO_2$, FIG. 6C shows the concentration profile of fluorine, FIG. 6D shows a refractive index profile which indicates the refractive index at respective positions along the line L in FIG. 4A, and FIG. 6E shows the photosensitivity distribution normalized by taking the maximum value as 1, each of the above diagrams being depicted in such a manner that they are respectively aligned in the radial direction.

As shown in FIG. 4A, the fiber grating type filter 2 according to the second embodiment includes an optical fiber 20 mainly comprised of silica glass. This optical fiber 20 comprises a core region 21 extending along a predetermined axis AX, an inner cladding 22 provided on the outer periphery of the core region 21, and an outer cladding 23 provided on the outer periphery of the inner cladding. In the second embodiment, the core region 21 is made from pure silica glass. The inner cladding 22 substantially corresponds to an optical cladding, and while being doped with $GeO_2$, a photosensitive dopant which also acts to increase the refractive index, it is also doped with fluorine, which acts to reduce the refractive index, in such a manner that the relative refractive index between it and the core region 21 is adjusted to 0.25% to 0.45%, and preferably 0.30% to 0.40%. The outer cladding 23 substantially corresponds to a physical cladding (jacket layer). As illustrated in FIG. 4B, the optical cladding 22 is a glass region with an outer diameter $2a$ which provides the substantial contribution of the cladding region to the propagation of the light. Furthermore, the physical cladding, which is also known as the jacket layer, is located on the outermost edge of the cladding region, and is a glass region provided in order to impart mechanical strength to the optical fiber 20.

Figure 5B:
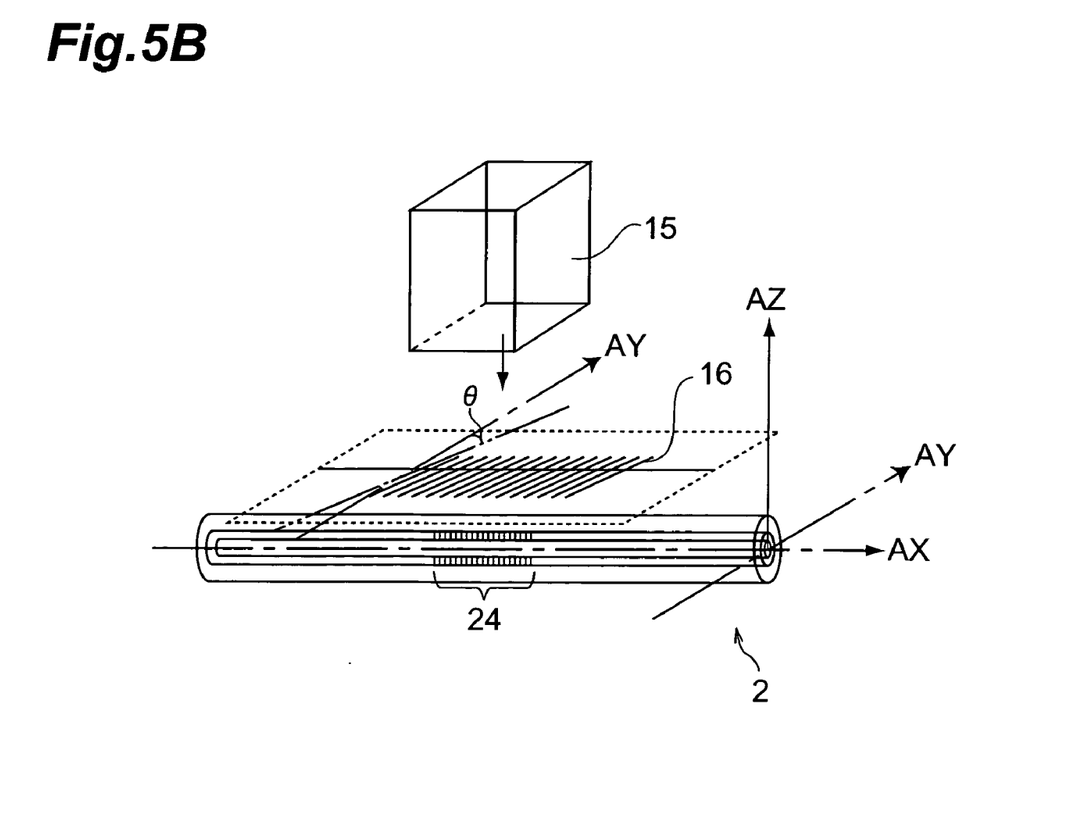
Figure 6A:
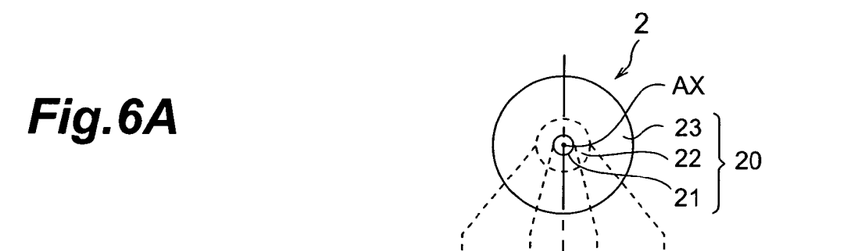
FIGS. 6A–6E illustrate the composition of an optical fiber applied to the fiber grating type filter according to the second embodiment.

In the fabrication of the fiber grating type filter 2 (SFG type filter) according to the second embodiment, as illustrated in FIG. 5B, firstly, ultraviolet light with a wavelength of 270 nm or less is irradiated from an ultraviolet light source 15, towards a phase grating 16 which is inclined at a predetermined angle of θ with respect to the optical axis AX of the optical fiber 20. By using thus phase grating 16, an ultraviolet light intensity distribution is created wherein the intensity of the irradiated ultraviolet light is modulated. By exposing the optical fiber 20 in the space where this ultraviolet light intensity distribution is created, a slanted grating wherein the refractive index changes periodically along the longitudinal direction of the optical fiber 20, is formed in a predetermined region 24 (filter region) of the optical cladding 22 which is photosensitive (see FIG. 5A). In FIG. 5A, the diagonal lines shown in the predetermined region 24 of the optical fiber 20 indicate the grating plane of the grating, and this grating plane is inclined with respect to the direction in which the light propagates (which coincides with the optical axis AX of the optical fiber 20). In other words, the slanted grating is not formed in the core region 21 with a high refractive index, but is only formed in the optical cladding 22.

Figure 6B:
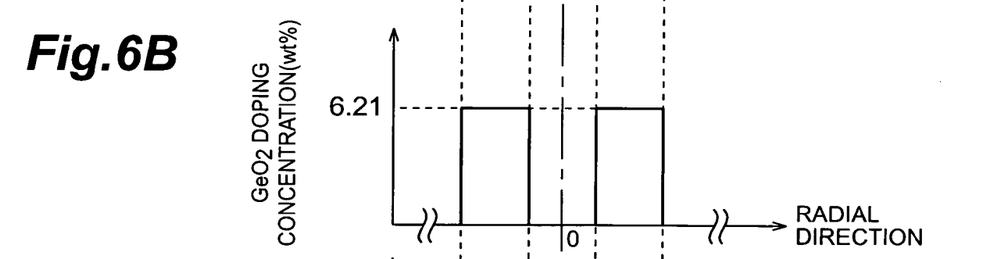
Figure 6C:
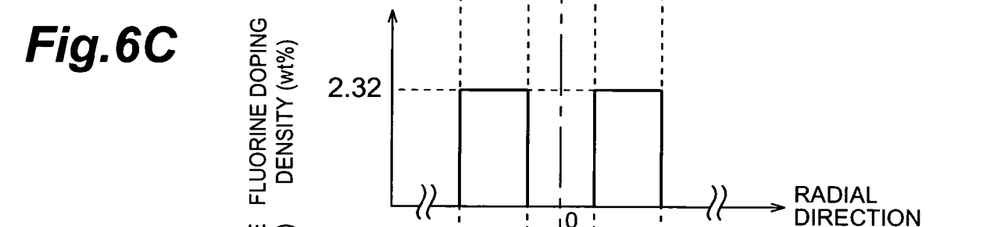
Figure 6D:
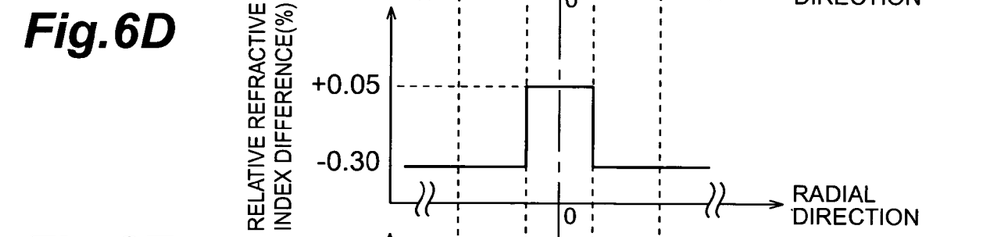
Figure 6E:
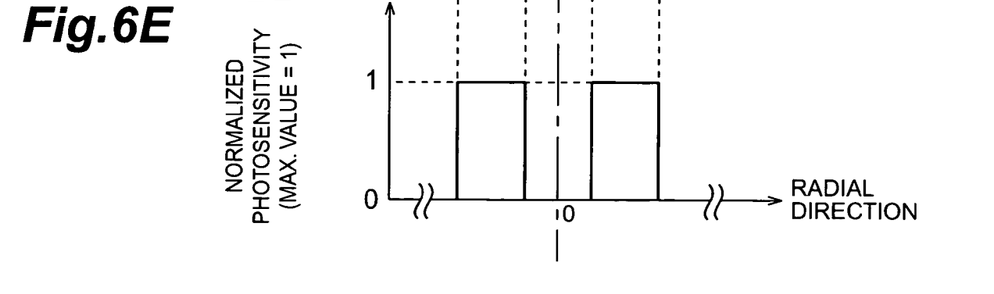

As shown in FIG. 6B, the core region 21 does not contain any $GeO_2$, but the optical cladding 22 is doped with $GeO_2$. This $GeO_2$ acts to increase the refractive index. On the other hand, the $GeO_2$ also provides the doped glass region with ultraviolet light photosensitivity. By adopting thus composition, the optical fiber 20 is caused to be photosensitive only in the optical cladding 22, as illustrated in FIG. 3E.

Furthermore, as illustrated in FIG. 6C, the optical fiber 20 is doped with fluorine. This fluorine mainly takes a chemical bonding structure of Si—F. Thereby, the added fluorine serves to reduce the refractive index. It is also possible to dope the optical cladding 12 with $B_2O_3$ instead of fluorine. $B_2O_3$ has a similar effect to fluorine in reducing the refractive index.

By setting the concentration profiles of the $GeO_2$, F (and/or $B_2O_3$) to those illustrated in FIG. 6B and FIG. 6C, a refractive index profile can be obtained in which the refractive index of the core region 21 is higher than that of the optical cladding 22 or physical cladding 23, as shown in FIG. 6D. The relative refractive index difference between the core region 21 and the optical cladding 22 of the optical fiber 20 is preferably 0.25% to 0.45%, which is equivalent to a 1.3 SMF (single-mode fiber) having a zero-dispersion wavelength in the 1.3 μm wavelength band. More preferably, the relative refractive index difference between the core region 21 and the optical cladding 22 is 0.30% to 0.40%. Furthermore, the cutoff wavelength for guaranteeing single-mode operation (wavelength $\lambda_c$) must be shorter than the shortest wavelength of the used wavelength band in the loss filter (for example, 1.3 μm). However, it is not preferable that the wavelength $\lambda_c$ is 1.1 μm or less, since this causes the bending loss increasing.

As described above, in the SFG type filter 2 according to the second embodiment, no grating is formed in the core region 21, and a grating is formed in the optical cladding 22 only, through a predetermined region 24 extending along the longitudinal direction of the optical fiber 20. This grating is a slanted grating whose grating plane is slanted by an angle of θ with respect to the optical axis AX.

This SFG type filter 2 has a characteristic feature in that it allows the angle of slant θ at which low reflectance is achieved to be reduced. By reducing this angle of slant θ, not only is it possible to narrow the loss bandwidth, but it is also possible to reduce the polarization dependent loss. Moreover, since the core region 21 is made from pure silica glass which does not contain any dopants, then it does not absorb light in the 1.3–1.6 μm band, which is the used wavelength band in optical communications, and hence the individual fiber will have low loss. Moreover, since the core region 21 is made from a uniform material, its structure is simplified.

(Concrete Examples)

Concrete examples of a fiber grating type filter according to the present invention are described successively below.

First, in the SFG type filter of Concrete Example 1, an optical fiber having a structure similar to that of the optical fiber applied to the fiber grating type filter 1 according to the first embodiment (FIG. 1A) is prepared. The core region of this optical fiber is doped with chlorine at a concentration of 4000 ppm. The optical cladding is doped with $GeO_2$ of 5 wt %, and fluorine of 2.5 wt %. The physical cladding is made of silica glass doped with fluorine of 1.2 wt %. In this optical fiber, the relative refractive index difference between the core region and the optical cladding is 0.33%, the outer diameter of the core region is 8.5 μm and the $\lambda_c$ wavelength is 1.22 μm.

The SFG type filter of Concrete Example 1 was fabricated by using a KrF excimer laser as a light source. A phase grating made of silica glass, designed with periodic chirping of 10 nm per cm at a period of 1.06 μm was used in forming the slanted grating. The laser irradiation width was 3 mm, and the slanted grating was formed by irradiating ultraviolet light onto the prepared optical fiber, until the predetermined quantity of loss was achieved.

Figure 7:
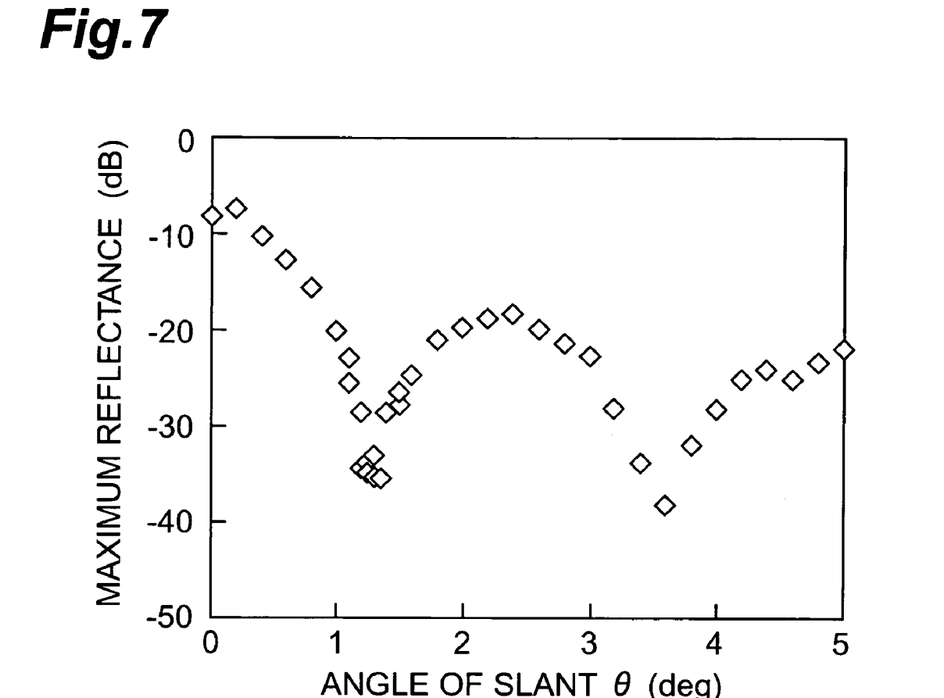
FIG. 7 is a graph showing the relationship between the angle of slant of the grating and the maximum reflectance, in a fiber grating type filter according to the first embodiment.

FIG. 7 is a graph showing the relationship between the angle of slant θ of the grating and the maximum reflectance, for the SFG type filter of Concrete Example 1 fabricated as described above as a fiber grating type filter according to the first embodiment. Here, the "maximum reflectance" is defined by the maximum value measured for the wavelength dependence of the reflectance in the measured wavelength range of 1500 nm to 1580 nm. As FIG. 7 reveals, the reflectance is greatest when the angle of slant θ is 0°. As the angle of slant θ becomes larger, so the maximum Reflectance becomes lower, while tracing a repeating pattern of increase and decrease. As can be seen from FIG. 7, the maximum reflectance has a minimum value when the angle of slant θ is 1.3°, and the corresponding value is −35 dB. When the relationship between the angle of slant θ and the maximum reflectance was measured in a similar manner for a conventional fiber structure, the maximum reflectance had a minimum value when the angle of slant θ was 3°.

Figure 8:
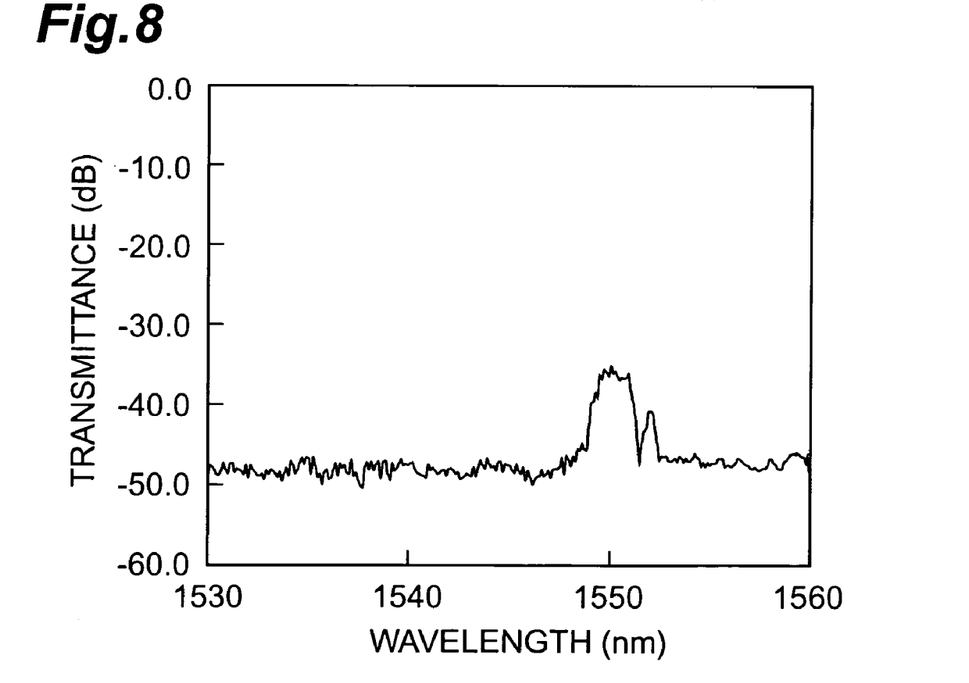
FIG. 8 is a graph showing the wavelength dependency of the reflectance of a fiber grating type filter according to the first embodiment.

FIG. 8 is a graph showing the wavelength dependence of the reflectance of the SFG filter of Concrete Example 1, fabricated as described above as a fiber grating type filter according to the first embodiment. Here, the angle of slant θ at which the maximum reflectance has a minimum value is 1.3°. As FIG. 8 indicates, the reflectance has a maximum value of −35 dB in the wavelength range from 1500 nm to 1580 nm, which is a reflectance level that presents no problems when the filter is applied to a transmission system.

Figure 9:
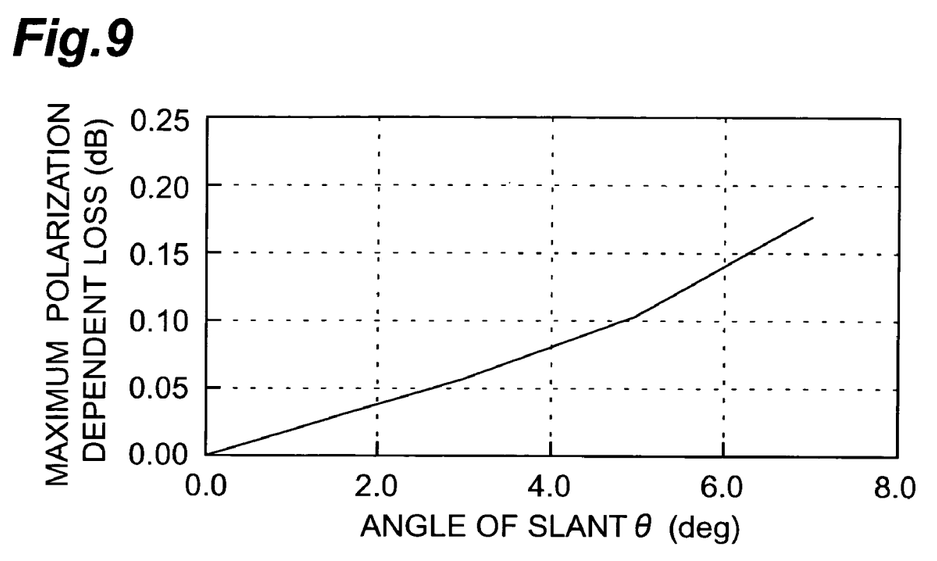
FIG. 9 is a graph showing the relationship between the angle of slant of the grating and the maximum polarization dependent loss in a fiber grating type filter according to the first embodiment.

Furthermore, FIG. 9 is a graph showing the relationship between the angle of slant θ of the grating and the polarization dependent loss for an SFG type filter of Concrete Example 1 fabricated as described above as a fiber grating type filter according to the first embodiment. As can be seen from FIG. 9, the polarization dependent loss can be decreased with the angle of slant θ is reduced. In an optical fiber which allows the angle of slant θ to be reduced to approximately 1.3° (the optical fiber according to the present invention applied to the SFG type filter of Concrete Example 1), the polarization dependent loss can be reduced by approximately one half, compared to a conventional fiber structure which requires an angle of slant of 3°.

Figure 10:
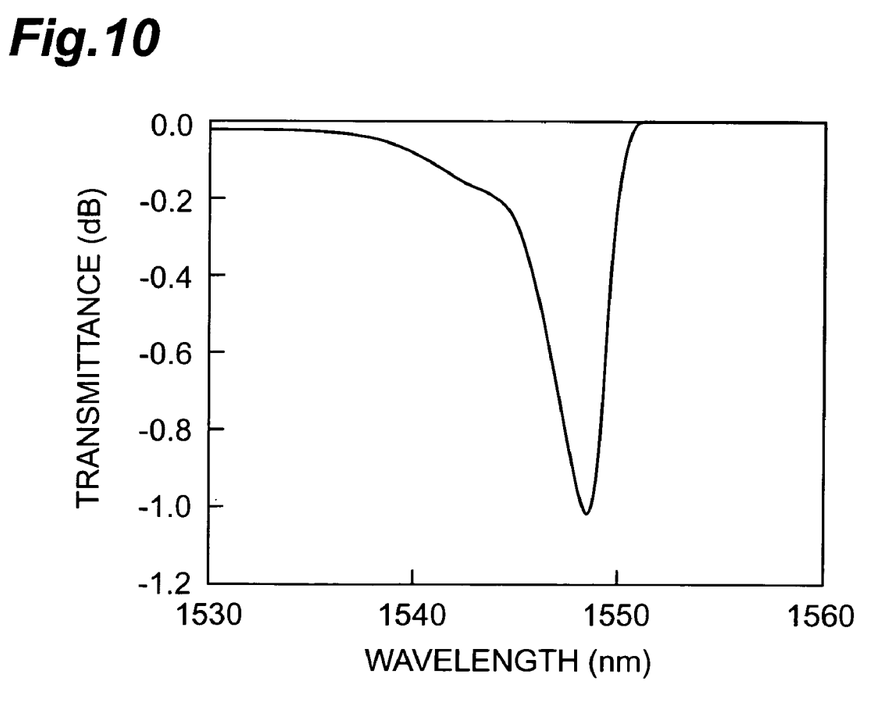
FIG. 10 is a graph showing the wavelength dependency of the transmittance of a fiber grating type filter according to the first embodiment.

Furthermore, FIG. 10 is a graph showing the wavelength characteristics of the transmittance of the SFG type filter of Concrete Example 1, fabricated as described above as a fiber grating type filter according to the first embodiment. Similarly to the foregoing description, the angle of slant θ of the grating is 1.3°, and the minimum transmittance is −1 dB. As the diagram reveals, the width of the waveband in which the transmittance is less than −0.2 dB is 6 nm, and the bandwidth in which the transmittance is less than −0.5 dB is 3.3 nm. These results indicate that the loss bandwidth of the SFG type filter of Concrete Example 1 is suitably narrow.

Figure 11:
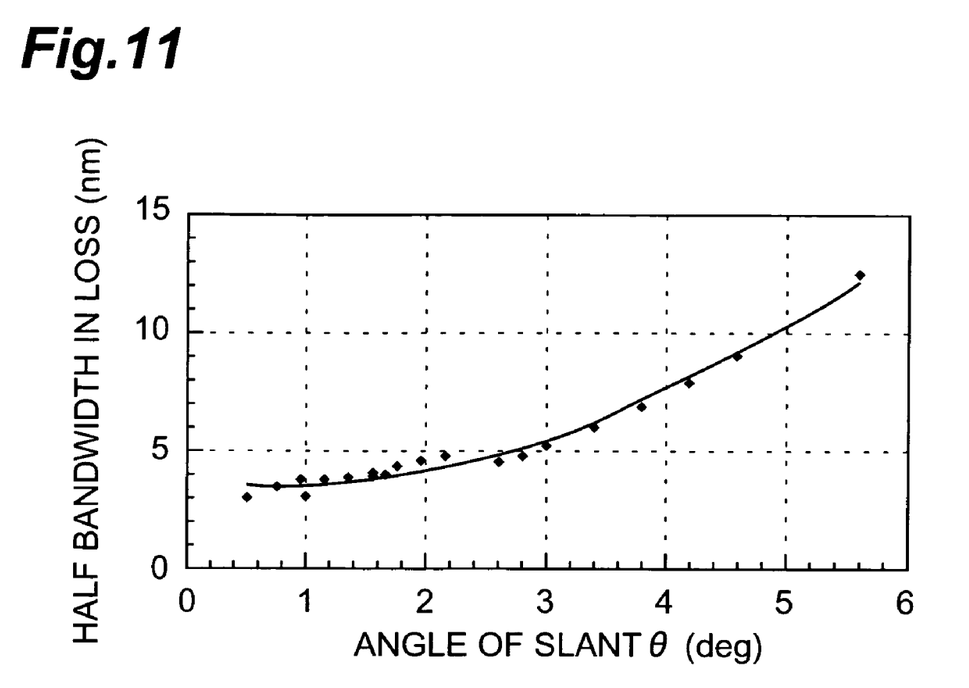
FIG. 11 is a graph showing the relationship between the angle of slant of the grating and the half bandwidth in loss, in a fiber grating type filter according to the first embodiment.

FIG. 11 is a graph showing the relationship between the angle of slant θ and the half bandwidth of the loss, with respect to the SFG type filter of Concrete Example 1 fabricated as described above as the fiber grating type filter according to the first embodiment. As FIG. 11 shows, the smaller the angle of slant θ, the greater the extent to which the half bandwidth of the loss can be reduced. In an SFG type filter fabricated with a conventional fiber structure, the angle of slant must be set to 3° in order to reduce reflectance, but in the case of the SFG type filter of Concrete Example 1, the bandwidth can be narrowed by approximately 60% from the conventional figure of 3°.

Next, in the SFG type filter of Concrete Example 2, an optical fiber having a structure similar to that of the optical fiber applied to the fiber grating type filter 1 according to the first embodiment (FIG. 1A) is prepared. The core region of the optical fiber thus prepared is doped with chlorine to a concentration of 4500 ppm, and the optical cladding is doped with $GeO_2$ of 4 wt % and $B_2O_3$ of 10 wt %. The physical cladding is made of silica glass doped with fluorine of 1.2 wt %. In this optical fiber, the relative refractive index difference between the core region and the optical cladding is 0.33%, the core diameter is 8.7 μm and the $\lambda_c$ wavelength is 1.25 μm.

The SFG type filter of Concrete Example 2 is fabricated by a similar process to that of the SFG type filter of Concrete Example 1 described previously. In the SFG type filter of Concrete Example 2, a minimum value for the maximum reflectance was obtained when the angle of slant θ of the grating was 1.6°, and this minimum value was −38 dB. Moreover, the half bandwidth of the loss was 3.5 nm when the angle of slant θ was 1.6°.

Furthermore, in the SFG type filter of Concrete Example 3, an optical fiber having a structure similar to that of the optical fiber applied to the fiber grating type filter 2 according to the second embodiment (FIG. 3A) is prepared. The core region of the optical fiber thus prepared is made of pure silica glass which is not doped with any impurities. The optical cladding is doped with $GeO_2$ of 4 wt % and fluorine of 2.7 wt %. The physical cladding is made of silica glass doped with fluorine of 1.1 wt %. In the optical fiber thus prepared, the relative refractive index difference between the core region and the optical cladding is 0.30%, the core diameter is 9.3 μm and the $\lambda_c$ wavelength is 1.24 μm.

The SFG type filter of Concrete Example 3 is fabricated by a similar process to that of Concrete Example 1 described previously. In the SFG type filter of Concrete Example 3, the maximum reflectance had a minimum value when the angle of slant θ of the grating was 1.40, and this minimum value was −39 dB. Furthermore, the half bandwidth of the loss at an angle of slant of 1.4° was 3.4 nm.

(Comparative Examples)

Next, various comparative examples for comparing the effects of the fiber grating type filter according to the present invention will be described.

First, in the SFG type filter of Comparative Example 1, an optical fiber having a structure similar to that of the optical fiber applied to the fiber grating type filter 1 according to the first embodiment (FIG. 1A) is prepared. The core region of the optical fiber thus prepared is doped with chlorine to a concentration of 4000 ppm, and the optical cladding is doped with $GeO_2$ of 5 wt % and fluorine of 2.5 wt %. The physical cladding is made of silica glass doped with fluorine of 1.2 wt %. In Comparative Example 1, the relative refractive index difference between the core region and the optical cladding is 0.33%, the core diameter is 9.5 µm, and the $\lambda_c$ wavelength is 1.35 µm.

The SFG type filter of Comparative Example 1 having the structure described above is also fabricated by a process similar to that of Concrete Example 1 described above. In the SFG type filter of Comparative Example 1, the maximum reflectance had a minimum value when the angle of slant θ of the grating was 1.4°, and this minimum value was −36 dB. However, in Comparative Example 1, two loss peaks are formed, in contrast to Concrete Example 1, and the bandwidth thereof is increased to 4 nm.

Moreover, in the SFG type filter of Comparative Example 2, an optical fiber applied to the fiber grating type filter 1 according to the first embodiment (FIG. 1A) is prepared. The core region of the optical fiber thus prepared is doped with chlorine to a concentration of 4000 ppm, and the optical cladding is doped with $GeO_2$ of 3 wt % and fluorine of 2.5 wt %. The physical cladding is made of silica glass doped with fluorine of 1.5 wt %. In Comparative Example 2, the relative refractive index difference between the core region and the optical cladding is 0.47%, the core diameter is 7.5 µm and the $\lambda_c$ wavelength is 1.25 µm.

The SFG type filter of Comparative Example 2 having the structure described above is also fabricated by a process similar to that of Concrete Example 1. In the SFG type filter of Comparative Example 2, the maximum reflectance had a minimum value when the angle of slant θ of the grating was 2.8°, and this minimum value was −36 dB. In this way, when the difference in refractive index between the core region and the optical cladding is large, then in Comparative Example 2, the angle of slant θ which gives a minimum value for the maximum reflectance is greater.

Furthermore, in an SFG type filter of Comparative Example 3, an optical fiber applied to the fiber grating type filter 1 according to the first embodiment (FIG. 1A) was prepared. The core region of the optical fiber thus prepared was doped with chlorine to a concentration of 4000 ppm, and the optical cladding was doped with $GeO_2$ of 5 wt % and fluorine of 2.5 wt %. The physical cladding was made of silica glass doped with fluorine of 1.2 wt %. In this Comparative Example 3, the relative refractive index difference between the core region and optical cladding is 0.33%, the core diameter is 7.5 µm, and the $\lambda_c$ wavelength is 1.05 µm.

The SFG type filter of Comparative Example 3 having the structure described above is also fabricated by a process similar to that of Concrete Example 1. In the SFG type filter of Comparative Example 3, the maximum reflectance had a minimum value when the angle of slant θ of the grating was 2.4°, and this minimum value was −39 dB. In this way, although the $\lambda_c$ wavelength is short, in Comparative Example 3, the angle of slant θ which gives a minimum value for the maximum reflectance is greater. Moreover, in Comparative Example 3, the bending loss in the case of a bending diameter of 20 mm is a high figure of 50 dB/m at a wavelength of 1.55 µm. This makes accommodation inside an SFG type filter difficult to achieve.

As described above, in accordance with the present invention, in an optical fiber applied to a fiber grating type filter, no grating is formed in the core region, and a short-period grating with a grating plane slanted with respect to the optical axis is formed in the optical cladding, within a predetermined region extending along the longitudinal direction. By means of this composition, the angle of slant at which minimum reflectance is achieved can be reduced to 2° or less, and hence a loss filter having low polarization dependent loss can be obtained.

Furthermore, since the core region of the optical fiber applied to the fiber grating type filter is made of a uniform material, it is easy to fabricate. In addition, since the core region is made of silica glass containing chlorine, or of pure silica glass, an optical fiber having low transmission loss can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fiber grating type filter comprising:
   an optical fiber mainly composed of silica glass, said optical fiber comprising: a core region extending along a predetermined axis, and not containing a photosensitive dopant which contributes to predetermined wavelength light photosensitivity as a glass property; and a cladding region provided on an outer periphery of said core region, and having at least a doped part with the photosensitive dopant; and
   a grating provided in a predetermined region of the doped part of said cladding region, which is doped with the photosensitive dopant, in a longitudinal direction of said optical fiber, said grating having a grating plane slanted with respect to the predetermined axis,
   wherein an angle of slant defined between the normal to the optical axis and the grating plane of said grating is greater than 1 degree but less than 2 degrees,
   wherein said cladding region comprises an inner cladding provided on and in direct contact with an outer periphery of said core region, said inner cladding containing the photosensitive dopant; and an outer cladding provided on and outer periphery of said inner cladding,
   wherein said optical fiber has a cutoff wavelength shorter than 1.3 µm but longer than 1.1 µm, and
   wherein a relative refractive index difference between said core region and the doped part of said cladding region is 0.30% or more but 0.40% or less.

2. The fiber grating type filter according to claim 1, wherein said core region of said optical fiber is doped with chlorine of 0.05 wt % or more.

3. The fiber grating type filter according to claim 1, wherein said core region of said optical fiber consists essentially of pure silica glass.

4. The fiber grating type filter according to claim 3, wherein said cladding region contains fluorine.

* * * * *